US010691619B1

(12) United States Patent
Gibson et al.

(10) Patent No.: US 10,691,619 B1
(45) Date of Patent: Jun. 23, 2020

(54) COMBINED INTEGRITY PROTECTION, ENCRYPTION AND AUTHENTICATION

(71) Applicant: Google LLC, Mountain View, CA (US)

(72) Inventors: Daniel Earle Gibson, Madison, WI (US); Monica C. Wong-Chan, Redwood City, CA (US); Milo Martin, Madison, WI (US)

(73) Assignee: Google LLC, Mountain View, CA (US)

( * ) Notice: Subject to any disclaimer, the term of this patent is extended or adjusted under 35 U.S.C. 154(b) by 242 days.

(21) Appl. No.: 15/787,625

(22) Filed: Oct. 18, 2017

(51) Int. Cl.
| | |
|---|---|
| *H04L 29/06* | (2006.01) |
| *G06F 12/14* | (2006.01) |
| *H04L 9/32* | (2006.01) |
| *G06F 3/06* | (2006.01) |
| *H04L 9/08* | (2006.01) |
| *H04L 9/14* | (2006.01) |

(52) U.S. Cl.
CPC .......... *G06F 12/1408* (2013.01); *G06F 3/067* (2013.01); *G06F 3/0622* (2013.01); *G06F 3/0659* (2013.01); *H04L 9/0894* (2013.01); *H04L 9/14* (2013.01); *H04L 9/3242* (2013.01); *H04L 63/0428* (2013.01); *G06F 2212/1052* (2013.01)

(58) Field of Classification Search
CPC .... G06F 12/1408; G06F 3/067; G06F 3/0659; G06F 3/0622; G06F 2212/1052; H04L 9/0894; H04L 9/14; H04L 63/0428; H04L 9/3242
See application file for complete search history.

(56) References Cited

U.S. PATENT DOCUMENTS

| | | | |
|---|---|---|---|
| 6,578,122 B2 | 6/2003 | Beukema et al. | |
| 7,299,266 B2 | 11/2007 | Boyd et al. | |
| 7,971,236 B1 | 6/2011 | Lentini | |
| 2004/0193832 A1 | 9/2004 | Garcia et al. | |
| 2012/0317239 A1* | 12/2012 | Mulder | G06Q 10/101 709/219 |
| 2013/0347092 A1 | 12/2013 | McBrearty et al. | |
| 2015/0261434 A1* | 9/2015 | Kagan | G06F 13/28 711/103 |
| 2016/0170910 A1 | 6/2016 | Inamdar et al. | |
| 2017/0337212 A1* | 11/2017 | Hayasaka | G06F 3/061 |
| 2018/0335975 A1* | 11/2018 | Cosby | G06F 3/0659 |

* cited by examiner

*Primary Examiner* — Joseph P Hirl
*Assistant Examiner* — Ka Shan Choy
(74) *Attorney, Agent, or Firm* — Lerner, David, Littenberg, Krumholz & Mentlik, LLP

(57) ABSTRACT

Network protocols generally implement integrity protection, encryption and authentication as separate validation steps. Since each validation step contributes encoding and processing overhead associated with individual packet transfers over the network, such network protocols can make inefficient use of limited packet space. Systems and methods according to the present disclosure combine integrity protection, encryption and authentication into a single validation step thereby making efficient use of limited packet space.

35 Claims, 9 Drawing Sheets

COMBINED INTEGRITY PROTECTION, ENCRYPTION AND AUTHENTICATION

BACKGROUND

Network protocols generally implement integrity protection, encryption and authentication as separate validation steps. Since each validation step contributes encoding and processing overhead associated with individual packet transfers over the network, such network protocols can make inefficient use of limited packet space.

SUMMARY

According to another aspect, the subject matter described in this disclosure relates to a method that includes transmitting, by an initiator network interface, a RMA read request message, to a target network interface, in response to a request initiated by one of a plurality of host computers electrically connected to the initiator network interface. The target network interface can access one of a plurality of registered memory regions of each of a plurality of host computers electrically connected to the target network interface. Each of the plurality of registered memory regions is within a physical memory of one of the plurality of host computers connected to the target network interface. Each of the plurality of registered memory regions corresponds to a memory region allocated to one of a plurality of applications executing on a corresponding one of the host computers connected to the target network interface. No more than one registered memory region is associated with any application executing on any host computer connected to the target network interface. Each of a first plurality of region access keys stored on the initiator network interface corresponds to one of the plurality of registered memory regions. The RMA read request message includes a RMA operation, an identifier of one a the registered memory regions, an identifier of a memory location within the identified registered memory region and host memory access request information generated based on at least the region access information corresponding to the identified registered memory region. The method includes receiving, at the initiator network interface, in response to the transmitted RMA read request, at least one RMA response communication, transmitted by the target network interface, including data retrieved from the identified memory location within the identified registered memory region.

According to another aspect, the subject matter described in this disclosure relates to a system comprising an initiator network interface that comprises one or more processors configured to transmit, by the initiator network interface, a RMA read request message, to a target network interface, in response to a request initiated by one of a plurality of host computers electrically connected to the initiator network interface. The target network interface can access one of a plurality of registered memory regions of each of a plurality of host computers electrically connected to the target network interface. Each of the plurality of registered memory regions is within a physical memory of one of the plurality of host computers connected to the target network interface. Each of the plurality of registered memory regions corresponds to a memory region allocated to one of a plurality of applications executing on a corresponding one of the host computers connected to the target network interface. No more than one registered memory region is associated with any application executing on any host computer connected to the target network interface. Each of a first plurality of region access keys stored on the initiator network interface corresponds to one of the plurality of registered memory regions. The RMA read request message includes a RMA operation, an identifier of one a the registered memory regions, an identifier of a memory location within the identified registered memory region and host memory access request information generated based on at least the region access key corresponding to the identified registered memory region. The one or more processors are configured to receive, at the initiator network interface, in response to the transmitted RMA read request, at least one RMA response communication, transmitted by the target network interface, including data retrieved from the identified memory location within the identified registered memory region.

According to another aspect, the subject matter described in this disclosure relates to a non-transitory medium storing instructions that, when executed by one or more processors, cause the one or more processors to transmit, by an initiator network interface, a RMA read request message, to a target network interface, in response to a request initiated by one of a plurality of host computers electrically connected to the initiator network interface. The target network interface can access one of a plurality of registered memory regions of each of a plurality of host computers electrically connected to the target network interface. Each of the plurality of registered memory regions is within a physical memory of one of the plurality of host computers connected to the target network interface. Each of the plurality of registered memory regions corresponds to a memory region allocated to one of a plurality of applications executing on a corresponding one of the host computers connected to the target network interface. No more than one registered memory region is associated with any application executing on any host computer connected to the target network interface. Each of a first plurality of region access keys stored on the initiator network interface corresponds to one of the plurality of registered memory regions. The RMA read request message includes a RMA operation, an identifier of one a the registered memory regions, an identifier of a memory location within the identified registered memory region and host memory access request information generated based on at least the region access information corresponding to the identified registered memory region. The instructions cause the one or more processors to receive, at the initiator network interface, in response to the transmitted RMA read request, at least one RMA response communication, transmitted by the target network interface, including data retrieved from the identified memory location within the identified registered memory region.

BRIEF DESCRIPTION OF THE DRAWINGS

The foregoing will be apparent from the following more particular description of example implementations of the invention, as illustrated in the accompanying drawings. The drawings are not necessarily to scale, emphasis instead being placed upon illustrating implementations of the present invention.

For purposes of clarity, not every component may be labeled in every figure. The drawings are not intended to be drawn to scale. Like reference numbers and designations in the various figures indicate like elements.

DETAILED DESCRIPTION

Figure 1:
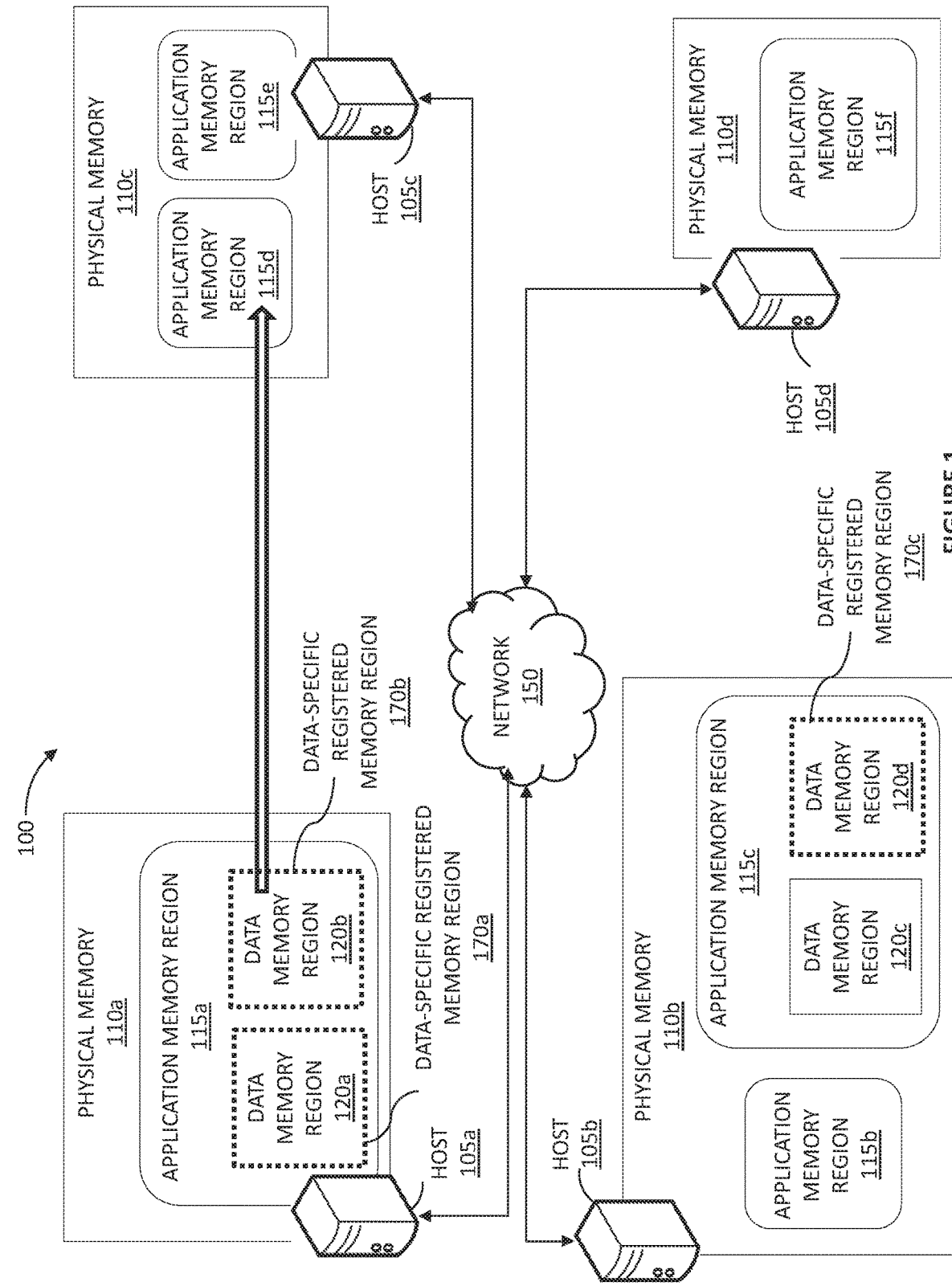
FIG. 1 is a diagram of an environment that includes data-specific registered memory regions according to conventional RMA techniques.

Multiple physical servers or hosts connected over a network may each execute one or more virtual machines or containers (collectively referred to herein as "virtualized computing instances" or VCIs), along with a hypervisor or container manager for managing the operation of the virtual machines or containers. Each VCI is allocated a region of memory within its corresponding host's physical memory. Within the host memory region that is allocated to a VCI, each application hosted by that VCI is allocated a region of memory.

Applications running on hosts connected over the network may directly access each other's data via remote memory access (RMA). For example, using an RMA operation, a first application running on a first host can, over the network, pull data belonging to a second application executing on a second host directly into the memory allocated to the first application on the first host as if the retrieved data were available locally to the first host. Before the data belonging to the second application can be remotely accessed, a region of memory in which the data is located must be registered. Registering a region of memory generates a region key that is specific to the registered memory region. The generated region key is a shared secret and is communicated to the second host out-of-band, for example via a remote procedure call (RPC). In existing RMA techniques, the registered memory region can be remotely accessed by providing the shared region key for that registered memory region. If the provided region key (or associated data) successfully authenticates against the generated region key, remote access to the registered memory region is granted. Otherwise, access to the registered memory region is denied. The use of a region key can provide a minimal level of security against unauthorized access to a registered memory region. However, an unauthorized third party that obtains the shared region key can potentially gain access to the corresponding registered memory region and the data within that registered memory region.

The security and integrity of data, both at rest and in transit, is generally ensured by the network protocols. Network protocols generally implement integrity protection, encryption and authentication as separate validation steps. Integrity protection generally includes addressing the network's underlying error rate or rate at which transferred content is corrupted at random while it is in transit over the network. Network protocols generally employ checksum based techniques in order to detect and correct corrupted contents caused by the network's underlying error rate. Because such network protocols are generally layered, the checksum based techniques can be redundant, thereby adding unnecessary cost associated with computing the checksums and reducing the efficiency of the packet transfer due to the packet overhead associated with carrying a checksum within the transferred packet. Moreover, attempting to reduce the packet overhead of the checksum by using smaller individual checksums instead of devoting valuable transfer capacity to larger checksums reduces the effectiveness of the checksums.

Network protocols may employ encryption as a means for defensively protecting sensitive data from unauthorized third parties while the data is at rest or in transit. Cryptography and encryption techniques secure the sensitive data so that it can only be decrypted with a special algorithm, logical key, mathematical formula and/or a combination of all of the above. Network protocols generally layer the encryption of data on top of the integrity protection of the unencrypted data thereby, adding to the overall compute and packet overhead. Network protocols generally employ authentication as a means for preventing unauthorized access to resources, such as remote access to host physical memory, on a per-request or per-connection basis. As mentioned above, verifying access to a registered memory region using a remote access key and a memory region key can provide a minimal level of security against unauthorized access for RMA communications. Network protocols generally perform authentication separately from the encryption and integrity protection validation steps. Each of the above mentioned measures can contribute encoding and processing overhead associated with individual packet transfers over the network. Thus, a network protocol that efficiently uses limited packet space by combining integrity protection, encryption and authentication into a single validation step is desirable.

Systems and methods according to the present disclosure combine integrity protection, encryption and authentication into a single validation step thereby making efficient use of limited packet space. As mentioned above, applications running on hosts connected over a network may directly access each other's data via remote memory access (RMA). Data can be remotely accessed if it is located within a registered memory region. Conventional RMA techniques enable remote access using data-specific registered memory regions. Using conventional RMA techniques, in order for a host to remotely access a specific data located within the physical memory of a server, the region of memory allocated for that specific data is registered for remote access and a region key is generated. The generated region key is specific to that registered memory region and host. Thus, the region key can only be used by that specific host to access the registered memory region. In contrast, implementations according to the present disclosure enable remote access using application-specific registered memory regions, i.e., one or more regions of memory allocated to an application are registered and a single region key is generated for each application-specific registered region of memory. The generated region key is specific to that application-specific registered memory region and is independent of any remote host. Thus, different remote hosts requesting RMA access to the same application-specific registered memory region can all use the same shared region key corresponding to that application-specific registered memory region.

FIG. 1 is a diagram of an environment 100 that includes data-specific registered memory regions according to conventional RMA techniques. As a brief overview, FIG. 1 shows multiple hosts connected to each other over a network. One or more applications may execute on each host. Each application executing on a host is allocated a region of memory (application memory region) within the physical memory of the host. Each application memory region may include one or more data memory regions allocated to data belonging to the application corresponding to the application memory region. The applications executing on the hosts may directly access each other's data (data memory regions) via remote memory access (RMA).

FIG. 1 shows a plurality of physical servers or hosts 105 such as a first host 105a, a second host 105b, a third host 105c and a fourth host 105d, each including a respective one of a plurality of physical memories 110a-110d (generally referred to as physical memories 110). One or more applications may execute on each of the hosts 105. Each application executing on a corresponding one of the hosts 105 is allocated a region of memory (application memory region 115) within the host's physical memory. For example, as shown in FIG. 1, an application executing on the first host 105a is allocated an application memory region 115a within the physical memory 110a of the first host 105a. A first application and a second application executing on the second host 105b are each allocated a respective application memory region 115b and 115c, within the physical memory 110b of the second host 105b. A first and a second application executing on the third host 105c are each allocated a respective application memory region 115d and 115e within the physical memory 110c of the third host 105c. An application executing on the fourth host 105d is allocated an application memory region 115f within the physical memory 110d of the fourth host 105d.

One or more data belonging to an application is allocated a region of memory (data memory region 120) within each application's memory region. For example, as shown in FIG. 1, a first and a second data belonging to the application executing on the first host 105a are each allocated a respective region of memory, such as the data memory region 120a and the data memory region 120b, within the application memory region 115a. First and a second data belonging to the second application executing on the second host 105b are each allocated a respective region of memory, such as a data memory region 120c and a data memory region 120d, within the application memory region 115c.

The applications executing on the hosts 105 may remotely access each other's data within the data memory regions 120a, 120b, 120c and 120d. For example, using an RMA operation, the application executing on the third host 105c can, over the network 150, pull the second data (or data stored in the second data memory region 120b) belonging to the application executing on the first host 105a directly into the application memory region 115d of the third application executing on the third host 105c host as if the second data memory region 120b were available locally on the third host 105c. Similarly, using an RMA operation, the second application executing on the fourth host 105d can pull the second data (or data stored in the memory region 120d) belonging to the second application executing on the second host 105b directly into the application memory region 115f of the application executing on the fourth host 105d as if the data memory region 120d were available locally on the fourth host 105d.

Registering a region of memory enables that region of memory to be remotely accessed via a RMA operation. As mentioned above, the data memory regions 120a and 120b correspond to first and a second data belonging to the application executing on the first host 105a. In order to prepare the first and the second data for remote access, their corresponding data memory regions 120a and 120b are registered. The data memory region 120a is registered as the first data-specific registered memory region 170a. Once the data memory region 120a is registered, a RMA operation can request access to the first data-specific registered memory region 170a using a memory key that corresponds to the first data-specific registered memory region 170a. If the request is granted, the RMA operation can access the data within the first data-specific registered memory region 170a (i.e. the first data of the first application executing on the first host 105a). Similarly, the data memory region 120b (i.e. the second data of the application executing on the first host 105a) is registered as the second data-specific registered memory region 170b.

In addition to the first and second data-specific registered memory regions 170a and 170b, FIG. 1 shows also shows a third data-specific registered memory region 170c. As mentioned above, the data memory regions 120c and 120d correspond to first and a second data belonging to the second application executing on the second host 105b. As shown in FIG. 1, the data memory region 120c corresponding to the first data belonging to the second application executing on the second host 105b is not registered and therefore, cannot be remotely accessed via a RMA operation. However, the second data belonging to the second application executing on the second host 105b can be remotely accessed via a RMA operation because the data memory region 120d is registered as the third data-specific registered memory region 170c.

Implementations according to the present disclosure include application-specific registered memory regions instead of data-specific registered memory regions. An application-specific registered memory region is created by registering one or more regions of memory allocated to an application within a host physical memory (i.e. application memory region). Application-specific registered memory regions are described below with reference to FIG. 2.

In some implementations, replay attacks are avoided by encrypting responses using a unique command ID counter as part of an initialization vector (IV) and including authentication data in the response. When the responses are received, the encrypted portions are decrypted. A result of the decryption is validated against the authentication data included in the response. The responses that do not successfully validate are dropped. In some implementations, the region key corresponding to an application-specific registered memory region forms a portion of the cryptographic key used for the encryption and decryption. In some implementations, all data associated with a successful transaction or remote access request are encrypted, decrypted and authenticated using the same region key and/or initialization vector. This approach provides both authentication and protection of the remotely accessed data as it is transmitted over the network.

Figure 2:
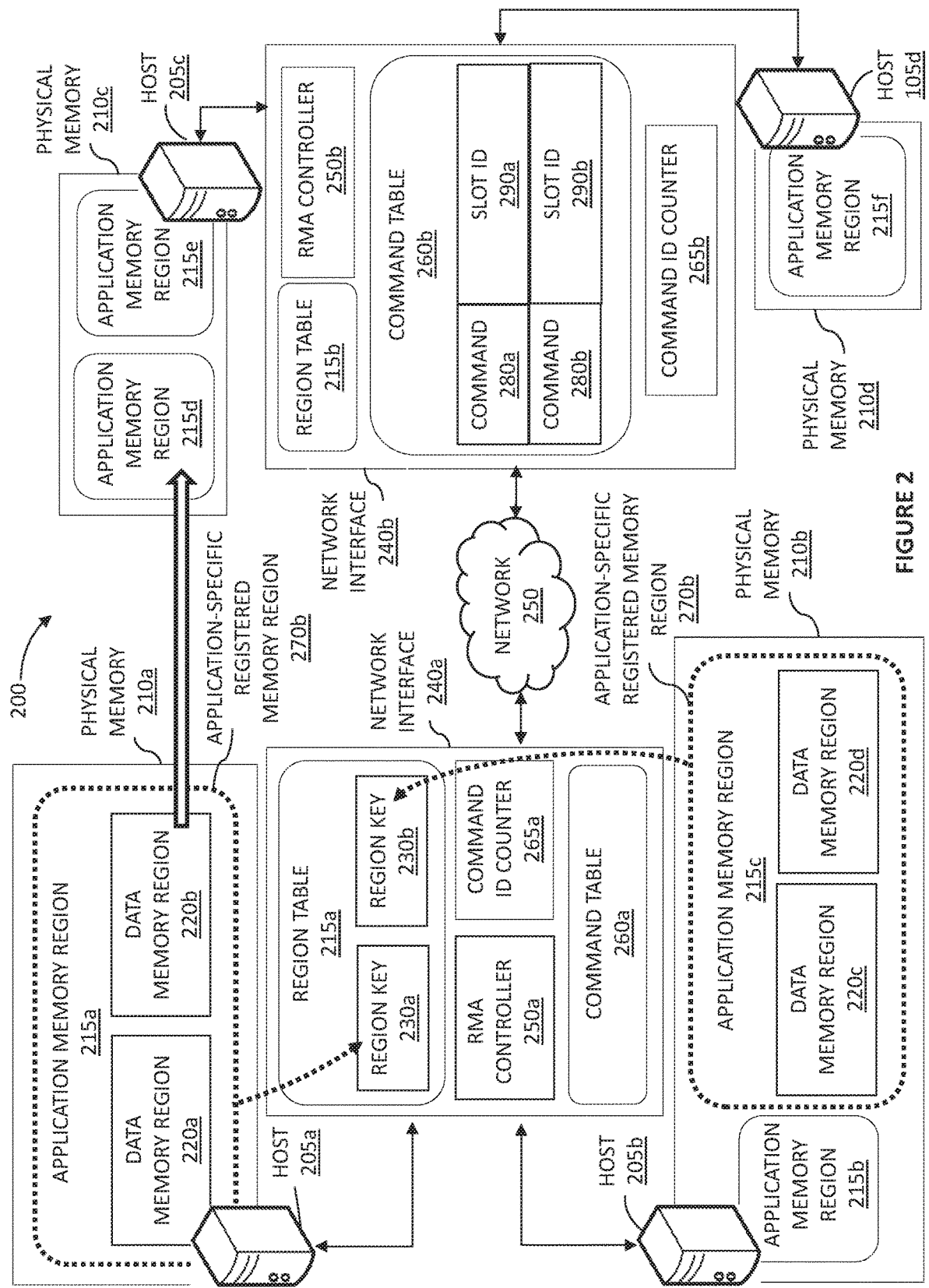
FIG. 2 is a diagram of a system for providing combined integrity protection, encryption and authentication according to an example implementation.

FIG. 2 is a diagram illustrating a system 200 for providing combined integrity protection, encryption and authentication according to an example implementation. The system 200 includes a plurality of physical servers or hosts 205 such as a first host 205a, a second host 205b, a third host 205c, and a fourth host 205d. Each of the plurality of hosts 205 includes a respective one of a plurality of physical memories 210a-210d (generally physical memories 210). One or more applications may execute on each of the hosts 205. Each application executing on a corresponding one of the hosts 205 is allocated one or more regions of memory, such as an application memory region 215, within the physical memory of the corresponding host. For example, as shown in FIG. 2, an application executing on the first host 205a is allocated an application memory region 215a within the physical memory 210a of the first host 205a. A first and a second application executing on the second host 205b are each allocated a respective application memory region 215b and 215c, within the physical memory 210b of the second host 205b. A first application and a second application executing on the third host 205c are each allocated a respective application memory region 215d and 215e within the physical memory 210c of the third host 205c. An application executing on the fourth host 205d is allocated an application memory region 215f within the physical memory 210d of the fourth host 205d.

One or more data belonging to an application is allocated a region of memory, such as a data memory region 220, within the corresponding application memory region 215. For example, as shown in FIG. 2, first and a second data belonging to the application executing on the first host 205a are each allocated a respective region of memory, such as the data memory region 220a and the data memory region 220b, within the application memory region 215a. First and a second data belonging to the second application executing on the second host 205b are each allocated a respective region of memory, such as a data memory region 220c and a data memory region 220d, within the application memory region 215c.

The system 200 includes a plurality of application-specific registered memory regions 270, such as a first application-specific registered memory region 270a and a second application-specific registered memory region 270b. Respective region keys 230, such as a first region key 230a and a second region key 230b, each correspond to one of the plurality of application-specific registered memory regions 270, in this case, application-specific registered memory regions 270a and 270b. The first region key 230a is generated when the application memory region 215a corresponding to the application executing on the first host 205a is registered as the first application-specific registered memory region 270a. The second region key 230a is generated when the application memory region 215c corresponding to the second application executing on the second host 205b is registered as the second application-specific registered memory region 270b. The first and the second region keys 230a and 230b are a shared secret (i.e., they are not shared in plain text) with one or more remote hosts and can be communicated to one or more remote hosts out-of-band in encrypted form. In some implementations, the keys can be generated using already known shared secrets. In some implementations, the keys can be generated using conventional key generation methods. The first application-specific registered memory region 270a encompasses the entire application memory region 215a and therefore, includes all of the data within the application memory region 215a such as the data within the data memory regions 220a and 220b.

Similarly, the second application-specific registered memory region 225b encompasses the entire application memory region 215c and therefore, includes all of the data within the application memory region 215c including the data within the data memory regions 220c and 220d.

Registering memory regions at the application-level can result in fewer registered memory regions and therefore, fewer region keys, such as the region keys 230a and 230b, stored in hardware. Accordingly, secure RMA communication between large numbers of hosts and applications can be achieved using smaller memories with reduced look-up times. As previously indicated, a region key generated for an application-specific registered memory region is specific to that application-specific registered memory region 225 rather than to that application-specific registered memory region and remote host end-point pair. Thus, different remote hosts requesting RMA access to the same application-specific registered memory region all use the same shared region key corresponding to that application-specific registered memory region.

Unlike typical host computers, the hosts 205 shown in FIG. 2 lack their own internal network interfaces. Instead, the system 200 includes a plurality of network interfaces 240, such as a first network interface 240a and a second network interface 240b (generally network interfaces 240), that each couple to multiple hosts 205, and which serve as network interfaces for those hosts. In some implementations, each of the plurality of hosts 205 is electrically connected one of the network interfaces 240 by a serial computer expansion bus or other direct bus connection. Among other functions, each of the network interfaces 240 is each configured to transmit and receive RMA (and other) communications, such as a RMA read request message and a RMA read response message on behalf of the hosts 205 to which it connects. In addition, in some implementations, the network interfaces 240 may function as top of rack (ToR) switches for the plurality of hosts 205 connected to the network interfaces 240.

In support of its RMA functionality, the first network interface 240a is configured to access a plurality of application-specific registered memory regions, such as the first and second application-specific registered memory regions 270a and 270b, of each of the first and second hosts 205a and 205b that are electrically connected to the first network interface 240a. The second network interface 240b is configured to access a plurality of application-specific registered memory regions of each of the third and fourth hosts 205c and 205d that are electrically connected to the second network interface 240b. As previously indicated, each of the first and second application-specific registered memory regions 270a and 270b is allocated to one of a plurality of applications executing on a corresponding one of the hosts 205.

The first and second network interfaces 240a and 240b may themselves be connected to each other via an electrical connection, such as a serial computer expansion bus or an Ethernet connection, or via an optical link, such as a fiber optic link. In some implementations with larger numbers of network interfaces 240, some pairs of network interfaces 240 may be connected via electrical links, whereas other network interfaces 240 may be connected via optical links.

As previously indicated, a plurality of region keys 230, such as region keys 230a and 230b, are stored on the first network interface 240a within a region table 215a. The first region key 230a corresponds to the first application-specific registered memory region 270a and the second region key 230b corresponds to the second application-specific registered memory region 270b. Similarly, a plurality of region keys 230, each corresponding to one of the plurality of application-specific registered memory regions of each of the third and fourth hosts 205c and 205d are stored on the second network interface 240b within a region table 215b.

The network interfaces 240 discussed above each includes a corresponding RMA controller 250, e.g., RMA controllers 250a and 250b. In some implementations, the RMA controllers 250 store the region tables 215 discussed above. In other implementations, the RMA controllers 250 have access to the region tables 215. The RMA controllers 250 are configured to generate (upon direction from an application on a host 210 coupled to the network interface 240), evaluate, and respond to RMA read requests and RMA read responses. Each of these functions is described briefly below, and then in detail in relation to FIGS. 5, 6, 7

As discussed above, the RMA controllers 250 are configured to generate (upon direction from an application on a host 210 coupled to the network interface 240) and transmit RMA read requests. Each RMA controller 250 in FIG. 2 is configured to construct a corresponding command in response to a request initiated by an application executing on a host 205 that is electrically connected to a corresponding one of the network interfaces 240 (referred to as "initiator network interface") in which the RMA controller 250 is included. The request is for remote access to data within an identified application-specific registered memory region 270 corresponding to an application executing on a remote host 205 that is electrically connected to a corresponding one of the network interfaces 240 (referred to as "target network interface"). In some implementations, the initiator network interface is different from the target network interface, the plurality of hosts that are electrically connected to the initiator network interface are not electrically connected to the target network interface and the plurality of hosts that are electrically connected to the target network interface are not electrically connected to the initiator network interface. In some implementations, the initiator network interface is the same as the target network interface. The constructed command includes an identification of the target host 205, an identification of the application-specific registered memory region 270 in which the requested data is located, an offset of the requested data relative to the memory location of the identified application-specific registered memory region, the size of the requested data and a message type identifying the command as a read data request. Each RMA controller 250 in FIG. 2 is further configured to generate a RMA read request based on the constructed command.

The network interfaces 240 discussed above each includes a corresponding command ID counter 265a and 265b (collectively referred to as command ID counters 265). The RMA controllers 250 are further configured to increment their respective command ID counters 265. The value of the command ID counter 265 once it is incremented is assigned to the constructed command as its command ID. In some implementations, the command ID counters 265 are 64 bit wrap-around hardware counters. In some implementations, the initial value of the command ID counters 265 is set at system boot time. In some implementations, re-booting the network interfaces 240 does not reset their corresponding command ID counters 265 and their values continue to increase monotonically in response to new commands.

The network interfaces 240 discussed above each includes a corresponding command table 260a and 260b (collectively referred to as command tables 260). Each RMA controller 250 is configured to store a constructed command as an entry for the corresponding command ID within the command table of the network interface in which the RMA controller 250 is included. The entry for the constructed command's command ID includes the constructed command corresponding to the command ID and the number of bytes left to be received.

As discussed above, the RMA controllers 250 are configured to transmit one or more RMA read response messages or an error response message in response to receiving a RMA read request message. In some implementations, the RMA controllers 250 are configured to time out a RMA read request message transmitted by an initiator network to a target network is timed out if the initiator network does not receive a corresponding RMA response from the target network or if not all the requested data is received in a certain amount of time. Timing out a RMA read request message provides integrity protection by detecting lost packets. Timing out a RMA read request message also provides security by avoiding replay attacks (or man-in-the-middle attacks) that may attempt to replay previous communications between the initiator and target networks. As discussed above, each RMA controller 250 is configured to store a constructed command as an entry for the corresponding command ID within the command table of the network interface in which the RMA controller 250 is included. The entry for a constructed command's command ID includes the constructed command corresponding to the command ID In some implementations, the transmitted RMA read request message is timed out after a pre-set amount of time elapses once the RMA read request message is transmitted by the initiator network interface.

As previously indicated, the system 200 provides combined integrity protection, encryption and authentication. In some implementations, the system 200 provides authenticating encryption. In some implementations, to provide authenticating encryption, portions of an RMA read request message are encrypted using the region key 230 for the application-specific memory region associated with the target application and an initialization vector created by the RMA controller 250 for the particular RMA read request. The initialization vector is included in the RMA read request message in plain text (i.e., not encrypted) but the shared region key is not included in the message. The RMA read request message also includes the authentication data created using the region key and the initialization vector.

Upon receipt of an RMA read request message, an RMA controller 250 cryptographically processes at least a portion of the RMA read request message using the region key 230 stored in the region table 215 associated with the memory region identified in the RMA read request message and information from the initialization vector. The processing results in decrypted data and authentication data, which is compared to the authentication data in the RMA read request. If the two values match, the request is deem authorized and authentic, and the request can be responded to.

Figure 3:
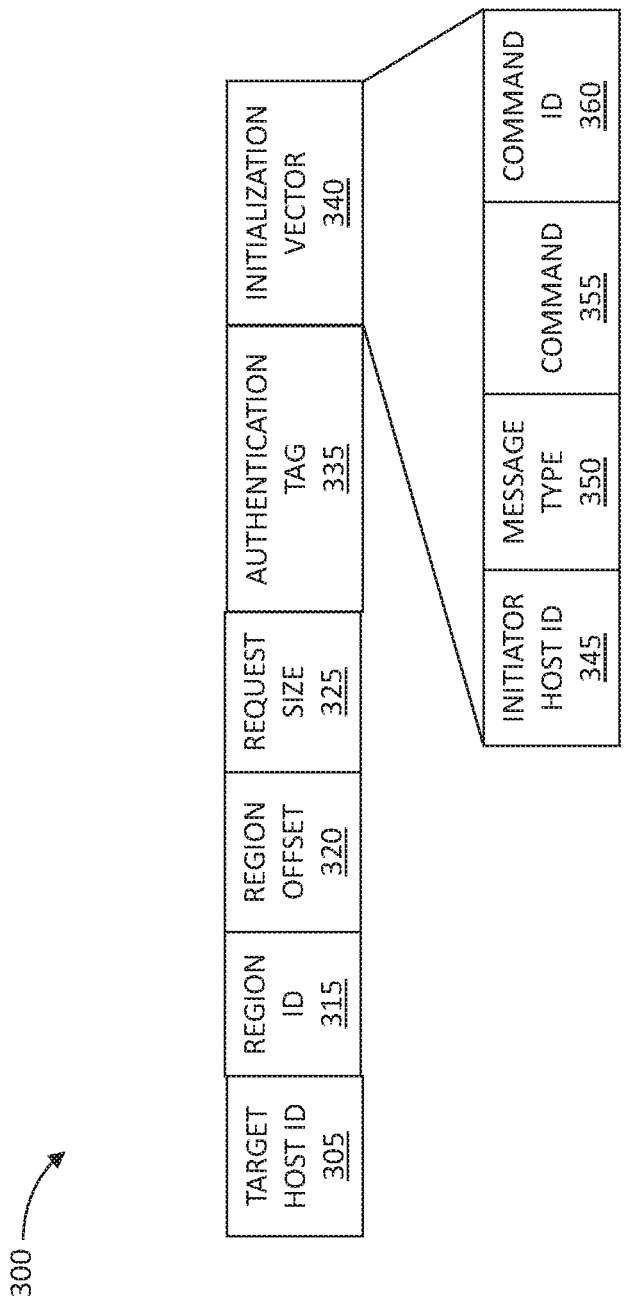
FIG. 3 is a diagram illustrating the cell format of an RMA read request message according to an example implementation.

As described further below, a similar authenticating encryption process can be used to create and transmit RMA response messages. FIG. 3 shows an example format of an RMA read request message 300. The RMA read request message 300 includes a target host ID 305, a region ID 315, a region offset 320, a request size 325, an authentication tag 335 and an initialization vector 340. The region ID 315 of the RMA read request message 300 identifies one of a plurality of application-specific registered memory regions that can be accessed by the network interface receiving the RMA read request message 300. The target host ID 305 of the RMA read request message 300 identifies one of the hosts that are electrically connected to the network interface receiving the RMA read request message 300. Therefore, the application-specific registered memory region identified by the region ID 315 is within the physical memory of the host identified by the target host ID 305 that is electrically connected to the network interface receiving the RMA read request message 300. The region offset 320 includes an offset relative to the memory location of the application-specific registered memory region identified by the region ID 315. The memory location of the retrieved data is determined based on the region offset 320 and the starting memory address of the application-specific registered memory region identified by the region ID 315. The size of the retrieved data is specified by the request size 325 of the RMA read request message 300.

The authentication tag 335 of the RMA read request message 300 includes authentication data such as a message authentication code (MAC). In some implementations, the RMA read request message 300 can include a portion that is encrypted. The encrypted portion of the RMA read request message 300 is decrypted using a cryptographic key formed from at least the stored region key that corresponds to the region ID 315. The decryption generates authentication data which is compared to the authentication data included in the authentication tag 335 of the RMA read request message 300. If the authentication data generated by the decryption matches the authentication data included in the authentication tag 335, the RMA read request is deemed authorized and authentic, and the request can be responded to. However, there are several reasons why the authentication data generated by the decryption may not match the authentication data included in the authentication tag 335. For example, the RMA read request message may have been encrypted using an incorrect region key or the contents of the RMA read request may have been corrupted. Therefore, if the two values do not match, the request is deemed unauthorized. In some implementations, an error message may be transmitted if the RMA read request message is unauthorized. If the comparison validates the authentication data included in the authentication tag 335, the decryption is determined to be successful and the source of the RMA read request message 300 is authorized to access the application-specific registered memory region identified by the region ID 315. In some implementations, no portion of the RMA read request is encrypted. In such implementations, the RMA read request is not decrypted.

The initialization vector 340 of the RMA read request message 300 includes an initiator host ID 345, a message type 350, a command slot 355 and a command ID 360. The initiator host ID 345 identifies the host that is the source of the RMA read request message 300. In some implementations, an RMA operation can be a RMA read request message, a RMA read response message, a RMA write request message, a RMA write request response message, a RMA request completion and a RMA error response message. The message type 350 includes a command encoding value for each RMA operation. This ensures that the IV 340 is unique. The command 355 and the command ID 360 included in the RMA read request message 300 are described below with respect to FIG. 5.

The use of a region key that corresponds to a specific application-specific registered memory region enables an authorized requesting application to remotely access a specific application's data while preventing the requesting application from attempting to access other applications' data located in other registered memory regions within the host physical memory. The end-to-end encryption described above prevents an unauthorized attack in which the unauthorized entity gains full access to the network links, giving the unauthorized entity the ability to snoop traffic and modify or inject traffic in the optical or electrical network links. A compromise of the network control plane may allow an unauthorized entity to reroute traffic from its destined network end point to a compromised end point. The end-to-end encryption approach also prevents entity that gains unauthorized access to the network from routing all traffic to a single compromised end point.

Figure 4:
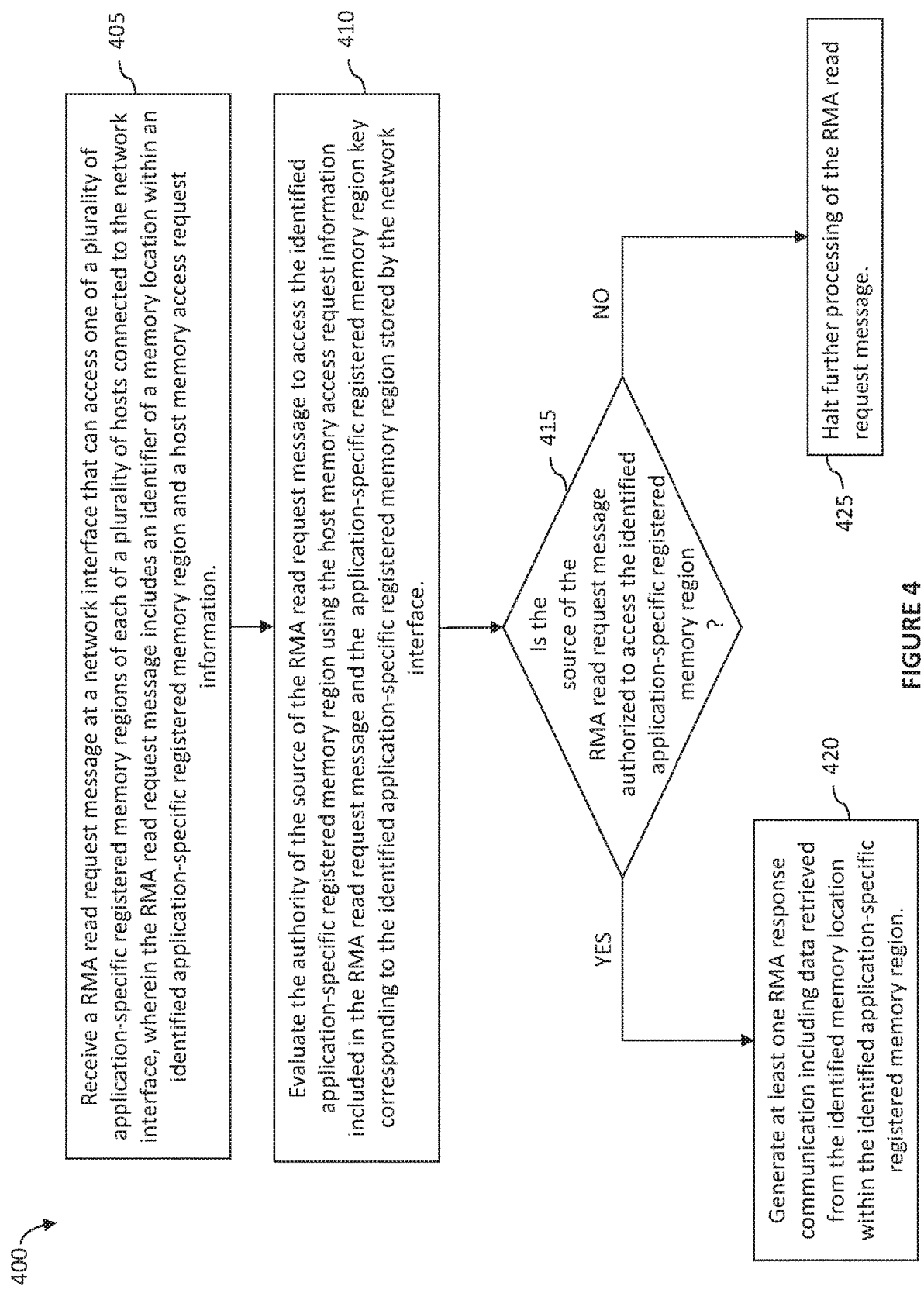
FIG. 4 is a flow diagram of an example method that includes evaluating a received RMA read request message, executed by the RMA controllers in FIG. 2.

As referenced above, the RMA controllers 250 in FIG. 2 are further configured to evaluate received RMA read request messages and form responses to the received RMA read request messages that are deemed authorized. FIG. 4 is a flow diagram of an example method 400 that includes evaluating a received RMA read request message, executed by the RMA controllers 250 in FIG. 2. In brief overview, the method 400 begins by receiving a RMA read request message at a network interface that can access one of a plurality of application-specific registered memory regions of each of a plurality of hosts connected to the network interface (stage 405). The method includes evaluating the authority of the source of the RMA read request message to access the identified application-specific registered memory region using the host memory access request information included in the received RMA read request message and the region key corresponding to the identified application-specific registered memory region stored by the network interface (stage 410). The method 400 includes determining if the source of the RMA read request message is authorized to access the identified application-specific registered memory region (stage 415). In response to determining that the source of the RMA read request message is authorized to access the identified application-specific registered memory region, the method 600 includes generating at least one RMA response communication including data retrieved from the identified memory location within the identified application-specific registered memory region (stage 420). In response to determining the source of the RMA read request message is not authorized to access the registered application-specific memory region, the method 400 includes halting further processing of the RMA read request message. In some implementations, an error response is generated and transmitted to the source of the RMA read request message. (stage 425).

The method 400 begins by receiving an RMA read request message at a network interface that can access one of a plurality of application-specific registered memory regions of each of a plurality of hosts connected to the network interface (stage 405). As referenced above, the network interfaces 240 in FIG. 2 are configured to receive a RMA read request message. The network interface that generates and transmits the RMA read request message is referred to as an initiator network interface and the network interface that receives the RMA read request message is referred to as a target network interface. In some implementations, the received RMA read request message has the example format shown in FIG. 3. Referring to FIG. 3, the received RMA read request message includes a region ID 315 and a target host ID 30. The region ID 315 identifies the application-specific registered memory region within the physical memory of the host specified by the target host ID 305 that is electrically connected to the target network interface. As shown in FIG. 2, the corresponding region keys for the application-specific registered memory regions are stored on the network interface in a region table 215. As previously indicated, the region key for an application-specific registered memory region is generated when the corresponding application memory region is registered. The region key is stored in the region table 215 and is also shared or communicated out-of-band with a remote host.

The received RMA read request message also includes an initialization vector (IV) 340. As previously indicated, the RMA controllers 250 in FIG. 2 are configured to create an IV for a particular generated RMA read request message. The RMA controllers 250 are also configured to encrypt portions of the generated RMA read request message using the shared region key corresponding to the application-specific registered memory region identified in the generated RMA read request message and the created IV. The received RMA read request message also includes the authentication tag 335. The authentication tag 335 includes the authentication data created when the portions of the received RMA read request message are encrypted using the shared region key and the IV is included in the RMA read request message. The RMA read request message with encrypted data is transmitted to a target network interface.

The method 400 includes evaluating the authority of the source of the received RMA read request message to access the identified application-specific registered memory region using the host memory access request information included in the received RMA read request message and the region key corresponding to the identified application-specific registered memory region stored by the network interface (stage 410). The RMA controllers 250 in FIG. 2 are configured to decrypt the encrypted portions of the received RMA read request message using a cryptographic key formed using the IV included in the RMA read request message and the corresponding stored region key of the application-specific registered memory region identified in the RMA read request message. The RMA controllers 250 in FIG. 2 are further configured to compare a result of the decryption to the authentication data included in the RMA read request message. The decryption generates authentication data which is compared to the authentication data included in the authentication tag 335 of the RMA read request message 300 as shown in FIG. 3. If the authentication data generated by the decryption matches the authentication data included in the authentication tag 335, the RMA read request is deemed authorized and authentic, and the request can be responded to. However, there are several reasons why the authentication data generated by the decryption may not match the authentication data included in the authentication tag 335. For example, the RMA read request message may have been encrypted using an incorrect region key or the contents of the RMA read request may have been corrupted. Therefore, if the two values do not match, the request is deemed unauthorized. In some implementations, an error message may be transmitted if the RMA read request message is unauthorized.

The method 400 includes determining if the source of the RMA read request message is authorized to access the identified application-specific registered memory region (stage 415). The RMA controllers 250 in FIG. 2 are configured to determine whether the source of the received RMA read request message is authorized to access the identified application-specific registered memory region. If the comparison of step 410 validates the authentication data included in the authentication tag 335 of the received RMA read request message, the RMA controllers 250 are configured to determine that the source of the RMA read request message is authorized to access the identified application-specific registered memory region. Additionally, if the comparison of step 410 validates the authentication data included in the authentication tag 335 of the received RMA read request message, the results of the decryption of the encrypted portions of the RMA read request message are considered valid.

However, if the comparison of step 410 does not validate the authentication data included in the authentication tag 335 of the received RMA read request message, the RMA controllers 250 are configured to determine that the source of the RMA read request message is not authorized to access the identified application-specific registered memory region. Additionally, if the comparison of step 410 does not validate the authentication data included in the authentication tag 335 of the received RMA read request message, all portions of the RMA read request message are considered invalid.

In response to determining that the source of the RMA read request message is authorized to access the identified application-specific registered memory region, the method 400 includes generating at least one RMA response communication including data retrieved from the identified memory location within the identified application-specific registered memory region (stage 420). The RMA controllers 250 in FIG. 2 are further configured to retrieve the data from the identified memory location within the identified application-specific registered memory region. Referring to FIG. 3, the RMA read request message includes a region offset 320. The region offset 320 specifies an offset relative to the memory location of the application-specific registered memory region identified by the region ID 315. The memory location of the retrieved data is determined based on the region offset 320 and the starting memory address of the application-specific registered memory region identified by the region ID 315. The size of the retrieved data is specified by the request size 325 of the RMA read request message. The RMA controllers 250 in FIG. 2 are further configured to form at least one RMA response that includes the retrieved data. The network interfaces 240 in FIG. 2 are further configured to transmit the at least one RMA response including the retrieved data.

In response to determining the source of the RMA read request message is not authorized to access the application-specific registered memory region, the method 400 includes halting further processing of the RMA read request message. In some implementations, an error response is generated and transmitted to the source of the RMA read request message (stage 425). The RMA controllers 250 in FIG. 2 are further configured to halt processing of the RMA read request message if the source of the RMA read request message is not authorized to access the registered application-specific registered memory region. In some implementations, the RMA controllers 250 also generate a RMA error response indicating that the RMA read request was not authorized.

Figure 5:
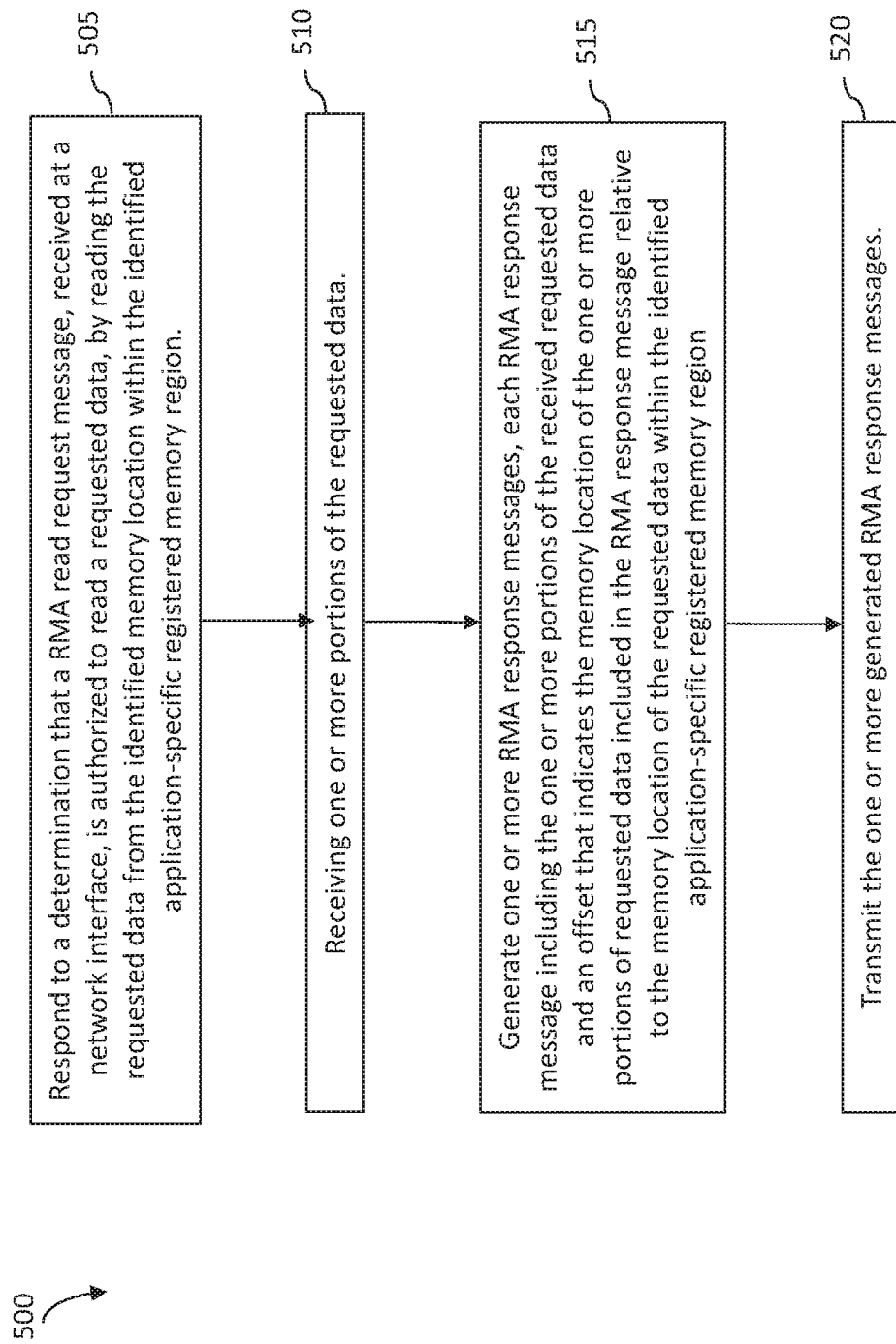
FIG. 5 is a flow diagram of an example method for generating one or more RMA responses to an authorized RMA read request message, suitable for use in the method shown in FIG. 4 and executed by the RMA controllers of FIG. 2.
Figure 6:
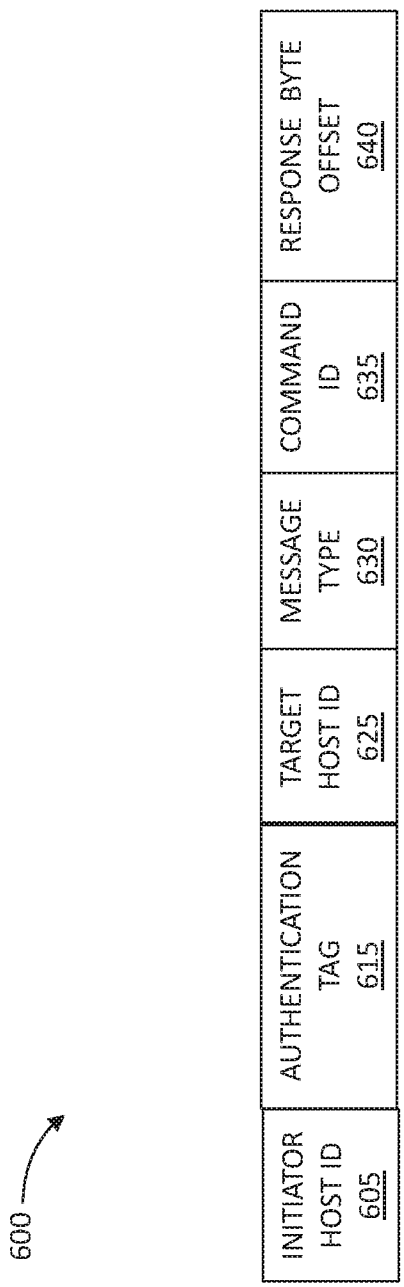
FIG. 6 is a diagram of an example format of a RMA response generated according to the method shown in FIG. 5.

As referenced above, the RMA controllers 250 in FIG. 2 are further configured to form a RMA response to a received RMA read request message if the source of the RMA read request message is authorized to access the identified application-specific registered memory region. FIG. 5 is a flow diagram of an example method 500 of forming an RMA response to an authorized RMA read request message, according to step 420 of FIG. 4 and executed by the RMA controllers 250 of FIG. 2. FIG. 6 is a diagram of an example format of a RMA response 600 generated according to the method 500 shown in FIG. 5. The two figures are described together below.

As mentioned above, FIG. 5 is a flow diagram of an example method 500 for generating one or more RMA responses to an authorized RMA read request message, according to step 420 of FIG. 4 and executed by the RMA controllers 250 of FIG. 2. The method 500 begins with responding to a determination that a RMA read request message, received at a network interface, is authorized to read a requested data, by reading the requested data from the identified memory location within the identified application-specific registered memory region (stage 505). The method 500 includes receiving one or more portions of the requested data (stage 510). The method 500 includes generating one or more RMA response messages, each RMA response message including the one or more portions of the received requested data and an offset that indicates the memory location of the one or more portions of requested data included in the RMA response message relative to the memory location of the requested data within the identified application-specific registered memory region (stage 515). The method 500 includes transmitting the one or more generated RMA response messages (520).

The method 500 begins with responding to a determination that a RMA read request message, received at a network interface, is authorized to read a requested data, by reading the requested data from the identified memory location within the identified application-specific registered memory region (stage 505). The RMA controllers 250 in FIG. 2 are configured to respond to a determination that a received RMA read request message is authorized to read a requested data by reading the requested data from the identified memory location within the identified application-specific registered memory region of a target host electrically connected to the network interface. Referring to FIG. 3, the example RMA read request message 300 includes a target host ID 305, a region ID 315, a region offset 320 and a request size 325. The target host ID 305 identifies one of a plurality of hosts electrically connected to the network interface. The region ID 315 identifies an application-specific registered memory region within the physical memory of the host identified by the target host ID 305. The region offset 320 specifies an offset relative to the memory location of the application-specific registered memory region identified by the region ID 315 within the physical memory of the target host specified by the target host ID 305. The memory location of the requested data within is determined based on the region offset 320 and the memory location of the application-specific registered memory region identified by the region ID 315. The request size 325 specifies the size of the requested data.

The method 500 includes receiving one or more portions of the requested data (stage 510). The requested data may arrive at the network interface in one or more portions. The RMA controllers 250 in FIG. 2 are further configured to receive the one or more portions of the requested data. The method 500 includes generating one or more RMA response messages, each RMA response message including the one or more portions of the received requested data and an offset that indicates the memory location of the one or more portions of requested data included in the RMA response message relative to the memory location of the requested data within the identified application-specific registered memory region (stage 515). The RMA controllers 250 in FIG. 2 are configured to generate one or more RMA response messages. Each RMA response message includes one or more portions of the received requested data. FIG. 6 is a diagram of an example format of a RMA response 600 generated according to the method 500 shown in FIG. 5. An example RMA response 600 includes an initiator host ID 605, an authentication tag 615. The initiator host ID 605 identifies one of a plurality of hosts that are electrically connected to the initiator network interface. The authentication tag 615 of the RMA response 600 includes authentication data such as a message authentication code (MAC).

The RMA read response 600 also includes a target host ID 625, a message type 630, a command ID 635 and a response byte offset 640. The target host ID 625 identifies the host that corresponds to the data included in the RMA read response. The message type 350 is based on an encoding of the corresponding RMA operation and includes a unique value for each phase of the RMA operation. In some implementations, an RMA operation can be a RMA read request message, a RMA read response message, a RMA write request message, a RMA write request response message, a RMA request completion and a RMA error response message. The response byte offset 640 specifies an offset relative to the memory location of the requested data. The response byte offset 640 identifies the location of the portion of the data included in a RMA response message relative to the starting memory address of the requested data. The command ID 635 is described with reference to FIG. 7.

In some implementations, the RMA controllers 250 in FIG. 2 are configured to encrypt the one or more RMA read responses. An RMA read response is encrypted using a cryptographic key formed from at least the stored region key that corresponds to the identified application-specific registered memory region and an IV. The a portion of the IV includes the target host ID 625, the message type 635, the command ID 635, the response byte offset 640 that is included in the RMA read response. Authentication data generated as a result of the encryption of the RMA read response is included in the authentication tag 615 of the RMA response message.

The method 500 includes transmitting the one or more generated RMA response messages (520). The RMA controllers 250 in FIG. 2 are further configured to transmit the generated one or more RMA response messages. The transmitted one or more RMA response messages may arrive at the destination network interface out of order. The inclusion of the response byte offset 640 enables the data in each RMA response message to be written into the correct memory location within the physical memory of the host identified by the initiator host ID 605 of the RMA response message. Additionally, including the response byte offset 640 within the IV 620 enables the IV for each RMA response message to be unique.

Figure 7:
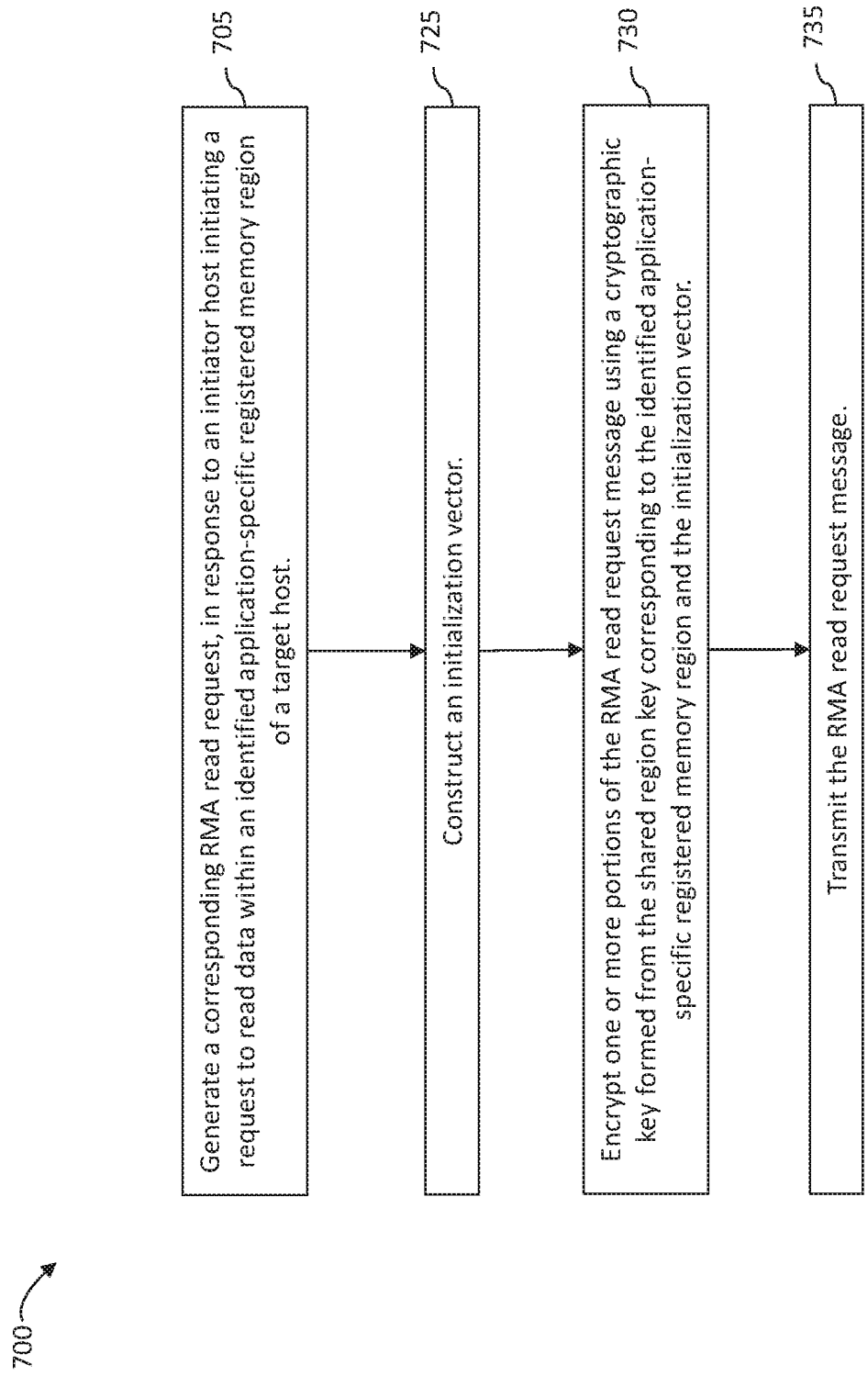
FIG. 7 is a flow diagram of an example method that includes generating and transmitting a RMA read request message, suitable for execution by the RMA controllers of FIG. 2.

As referenced above, the RMA controllers 250 of FIG. 2 are further configured to generate and transmit RMA read request messages. FIG. 7 is a flow diagram of an example method 700 that includes generating and transmitting a RMA read request message, suitable for execution by the RMA controllers 250 of FIG. 2. The method 700 begins when an initiator host computer connected to an initiator network interface initiates a request to read data on a target host and includes generating a command corresponding to the request for remote access to data initiated by the initiator host (stage 705). The method 700 further includes generating a RMA read request message including an initialization vector (stage 725). The method 700 includes encrypting one or more portions of the RMA read request message (stage 730). The method 700 includes transmitting the generated RMA read request message including one or more portions of encrypted data (stage 735).

The method 700 begins when an initiator host connected to an initiator network interface initiates a request to read data on a target host and includes generating a command corresponding to the request initiated by the initiator host (705). As referenced above, the RMA controllers 250 are configured to construct a command in response to a request initiated by an application executing on one of the plurality of hosts 205 that are electrically connected to one of the network interfaces 240 (referred to as "initiator network interface"). The request is for remote access to data within an identified application-specific registered memory region 215 corresponding to an application executing on one of the plurality of remote hosts 205 that are electrically connected to a different one of the network interfaces 240 (referred to as "target network interface"). Each command 280, constructed in response to a request initiated by a host connected to the initiator network interface, is stored within a command table 265 of the initiator network interface 250. Each of the stored commands is identified by a corresponding unique command ID. The initiator network interface 240 also includes one a command ID counter 260. Upon constructing the corresponding command for a request initiated by the host connected to the initiator network interface 240, the RMA controllers 250 of FIG. 2 are further configured to increment the command ID counter 260 of the initiator network interface 240. The resulting value of the command ID counter 260 is used as the unique command ID for the constructed command. The RMA controllers 250 are configured to store the constructed command and its corresponding unique command ID within the command tables 265 in a location specified by a slot ID. The slot ID serves as an index into the command table 265.

The method 700 further includes generating a RMA read request message including an initialization vector (stage 725). A corresponding RMA read request message is generated for the command constructed in response to a request initiated by an application executing on an initiator host. The generated RMA read request message includes an initialization vector based on an identification of the initiator host, a message type, the constructed command and its corresponding command ID. As referenced above, the RMA controllers 250 of FIG. 2 are configured generate a RMA read request message corresponding to the constructed command. As previously discussed in reference to FIG. 3, a RMA read request message includes a target host ID 305, a region ID 315, a region offset 320, a request size 325, an authentication tag 335 and an initialization vector 340. The initialization vector 340 includes the initiator host ID 345, the message type 350, the constructed command 355 and the command ID 360. The message type 350 includes the command encoding for a RMA read request message. The command 355 is the command constructed in response to a request initiated by an application executing on an initiator host. The command ID 360 of the initialization vector includes the command's corresponding command ID.

The method 700 includes encrypting one or more portions of the RMA read request message (stage 730). One or more portions of the generated RMA read request message are encrypted using a cryptographic key formed from the shared region key corresponding to the identified application-specific registered memory region and the initialization vector of the generated RMA read request message. As previously discussed, registering an application memory region as an application-specific registered memory region generates a region key that is specific to the application-specific registered memory region. The generated region key is a shared secret and is communicated to a remote host (such as the initiator host) out-of-band, for example via a remote procedure call (RPC). The portions of the RMA read request can be encrypted, for example, using AES-GCM or some other form of authenticated encryption that results in both cypher text associated with the content to be encrypted, as we well as corresponding authentication data, such as the MAC discussed above. The authentication data created when the portions of the generated RMA read request message are encrypted using the shared region key and the IV is included in the RMA read request message.

As referenced above, the RMA controllers 250 of FIG. 2 are further configured to encrypt one or more portions of a generated RMA read request message. The shared region corresponding to the identified application-specific registered memory region is retrieved from the command table 265 of the initiator network interface 240. As previously discussed, the RMA controllers 250 are configured to store the corresponding command for the generated RMA read request message within the command table 265 in a location corresponding to the command's unique command ID. Also, stored within the command table 265 in the location corresponding to the command's command ID is the shared region key corresponding to the application-specific registered memory region 215 identified in the generated RMA read request message as the region ID 315 shown in FIG. 3. The RMA controllers 250 are further configured to encrypt the one or more portions of the generated RMA read request message using a cryptographic key formed from the retrieved shared region key corresponding to the identified application-specific registered memory region 215 and the initialization vector 340 included in the generated RMA read request message (shown in FIG. 3). As previously discussed, encrypting portions of the generated RMA read request message using the shared region key and the IV 340 creates authentication data. This authentication data is included in the RMA read request message as the authentication tag 335 (shown in FIG. 3).

Figure 8:
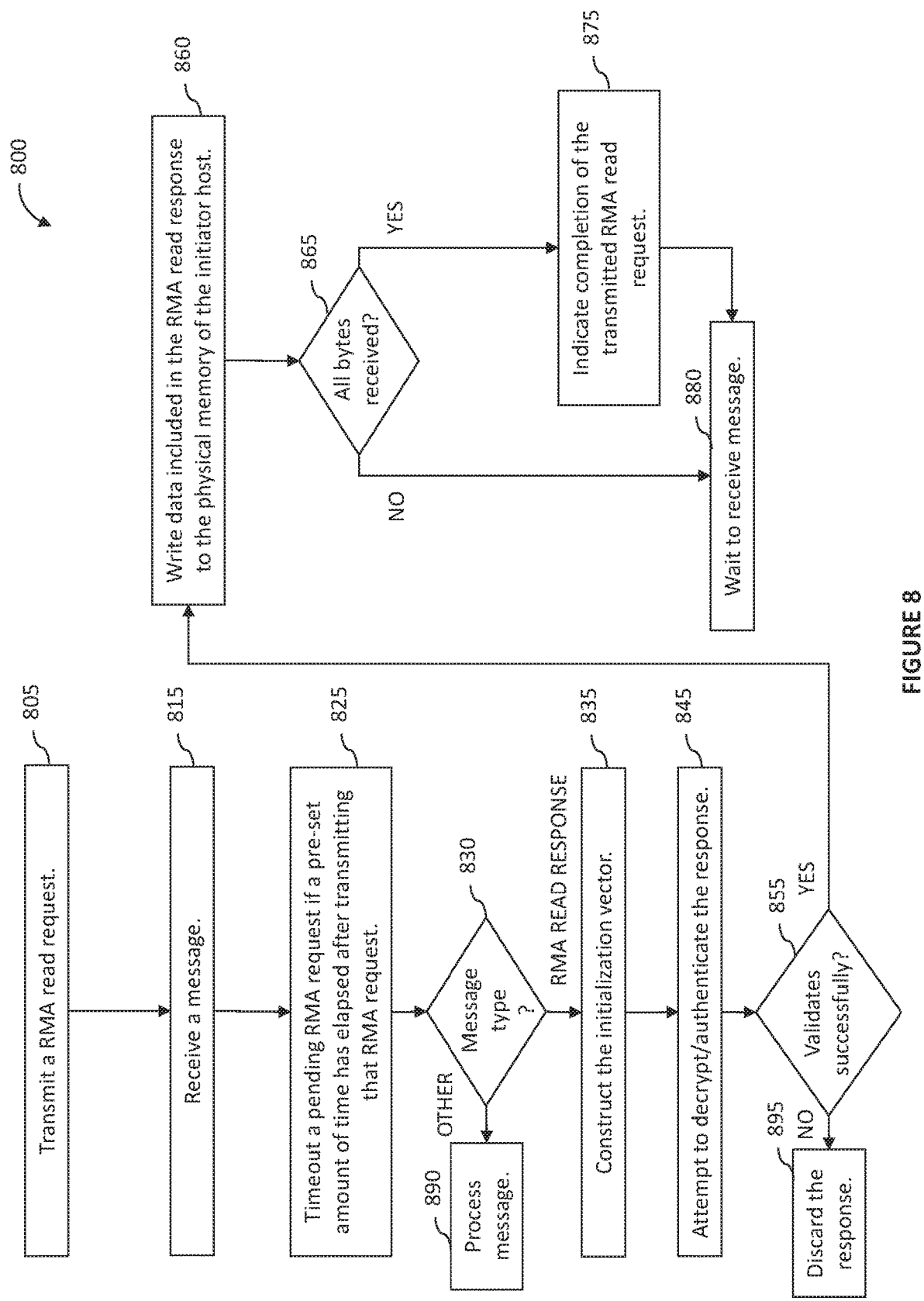
FIG. 8 is a flow diagram of an example method that includes receiving one or more RMA responses to the transmitted RMA read request message, suitable for execution by the RMA controllers of FIG. 2.

The method 700 includes transmitting the RMA read request message (stage 735). The RMA controllers 250 in FIG. 2 are further configured to transmit the generated RMA read request including one or more portions of encrypted data to a target network interface 240. As referenced above, the RMA controllers 250 of FIG. 2 are further configured to receive one or more RMA responses in response to the transmitted RMA read request message. FIG. 8 is a flow diagram of an example method 800 of processing received RMA responses, suitable for execution by the RMA controllers 250 of FIG. 2. The method 800 begins with an initiator network interface transmitting a RMA read request message (stage 805). The method 800 includes timing out a pending RMA request if a pre-set amount of time has elapsed after transmitting that RMA request (stage 825). The method 800 includes determining the type of the received message (stage 830). If the received message is not a RMA read response, the method 800 includes processing the message (stage 890). If the received message is determined to be a RMA read response, the method 800 includes reconstructing an initialization vector for the response message (835). The method 800 includes decrypting the RMA read response and validating the contents (855). The method 800 includes determining whether the results of the decryption validate successfully (stage 855). If the results of the decryption do not validate successfully, the method 800 includes discarding or dropping the RMA read response (stage 895). If the results of the decryption validate successfully, the method 800 includes writing the data included in the RMA read response to the physical memory of the initiator host (stage 860). The method 800 includes determining whether all bytes of the data have been received (stage 865). If all bytes of the data have been received, the method 800 includes indicating a completion of the transmitted RMA read request message that corresponds to the RMA read response (stage 875). If all bytes of the data have not been received or if a completion of the transmitted RMA read request message that corresponds to the RMA read response is indicated, the method 800 includes waiting to receive a next message at the initiator network interface (stage 880).

The method 800 begins with the initiator network interface transmitting a RMA read request message (stage 805). As previously discussed, an RMA read request message is generated in response to a request for remote access to data initiated by an initiator host connected to the initiator network interface. The request can be generated, for example, using the method 700 shown in FIG. 7.

The method 800 further includes receiving a message at the initiator network interface (stage 815). As previously discussed, the RMA controllers 250 of FIG. 2 are configured to receive messages, such as a RMA read response or an error response, that are related to previously transmitted RMA read request messages. Other types of messages include without limitation, network interface status inquiries and RMA write requests.

The method 800 includes timing out any pending RMA requests if a pre-set amount of time has elapsed (stage 825). As previously discussed, the RMA controllers 250 of FIG. 2 are further configured to timeout a pending RMA request if a pre-set amount of time has elapsed after the RMA request has been transmitted. In response to timing out a pending RMA request, the RMA controllers 250 of FIG. 2 are further configured to modify the corresponding entry for the RMA request in the command table 265. Due to the modification, after a pending RMA request is timed out, any response arriving at the initiator network interface 240 that corresponds to the timed out RMA request will no longer be able to be decrypted or validated, and thus will be dropped when it is received at the initiator network interface 240.

The method 800 includes determining the type of the received message (stage 830). The RMA controllers 250 of FIG. 2 are configured to determine the type of the message received by an initiator network interface 240. As discussed with reference to FIG. 6, the message type 630 of a RMA read response includes an encoded value that corresponds to a RMA read response.

If the received message is not a RMA read response, the method 800 includes processing the message (stage 890). However, if the received message is a RMA read response, the method 800 includes constructing the initialization vector (835). As previously discussed, one or more portions of the RMA read response are encrypted before the RMA read response is transmitted. The one or more portions of the RMA read response are encrypted using a cryptographic key formed using a region key and an initialization vector. However, all of the information needed to construct the initialization vector may not be transmitted in the RMA read response. When a RMA read response is received, the RMA controllers 250 of FIG. 2 are configured to decrypt the received RMA read response by re-constructing an initialization vector for the received RMA read response. As previously mentioned, some of the information needed to re-construct the initialization vector may not be transmitted in the RMA read response. The missing information needed for re-constructing the initialization vector is determined by first extracting a command ID 635 from the received RMA read response. As also previously discussed, when a RMA read request is generated, the corresponding command is assigned a unique command ID and both the command and its command ID are stored in the command table 265 in a location specified by a slot ID. The slot ID serves as the index into the command table 265. The extracted command ID 635 and the slot ID are used to retrieve the command 280 stored within the command table 265 of the initiator network interface 240. The retrieved command 280 is for the corresponding RMA read request of the received RMA read response. Referring back to FIG. 6, the RMA read response also includes a target host ID 625, a message type 630 and a response byte offset 640. The RMA controllers 250 are configured to re-construct the initialization vector for the received RMA read response based on the retrieved command 280 corresponding to the command ID 635 as well as the, the target host ID 625, the message type 630 and the response byte offset 640 that is included in the RMA read response.

The method 800 includes decrypting the received RMA read response and validating the decrypted contents (855). The RMA controllers 250 of FIG. 2 are further configured to decrypt the encrypted portions of the received RMA read response are decrypted using a cryptographic key formed by the shared region key corresponding to the identified application-specific registered memory region and the constructed initialization vector. The shared region key is retrieved from the command table 265 of the initiator network interface 240 using the command ID 635 of the RMA read response.

The method 800 includes determining whether the decrypted contents validate successfully (stage 855). The RMA controllers 250 of FIG. 2 are configured to compare a result of the decryption of the received RMA read response to the authentication data included in the RMA read response. As previously discussed with reference to FIG. 6, the authentication tag 615 of the RMA read request message 600 includes authentication data such as a message authentication code (MAC). The RMA controllers 250 are configured to determine that the decrypted contents of the RMA read response are successfully validated if the decryption results include authentication data that matches the authentication data included in the authentication tag 615 of the RMA read response. The RMA controllers 250 are configured to determine that the decrypted contents of the RMA read response are not successfully validated if authentication data resulting from the decryption process does not match the authentication data included in the authentication tag 615 of the RMA read response. If the two values match, the request is deemed authorized and authentic and the request response can be further processed according to stage 860, discussed below. If the decrypted contents do not validate successfully, the method 800 includes discarding or dropping the RMA read response (stage 895).

If the decrypted contents validate successfully, the method 800 includes writing the data included in the RMA read response to the physical memory of the initiator host (stage 860). Upon determining that the decrypted contents of the RMA read response validate successfully, the RMA controllers 250 are configured to write the data included in the RMA read response to the physical memory 210 of the initiator host 205 at a memory location based on the response byte offset 640 of the RMA read response. As previously discussed, the command table 265 of the initiator network interface 240 stores an entry for each transmitted RMA read request message based on the transmitted RMA read request message's corresponding command ID. The entry identified by the corresponding command ID of a transmitted RMA read request message includes the number of bytes expected to be received if the corresponding RMA read responses have started to arrive at the initiator network interface 240. The initial value of the expected number of bytes is set based on the size of the requested data identified in the transmitted RMA read request message. The RMA controllers 250 of FIG. 2 are configured to decrement the number of bytes expected to be received for the RMA read request message by the number of data bytes included in the received RMA read response.

The method 800 includes determining whether all bytes of the data have been received (stage 865). The RMA controllers 250 of FIG. 2 are further configured to determine whether all bytes of the data requested by the corresponding RMA read request message identified by the command ID included in a received RMA read response have been received.

If all bytes of the data requested by the corresponding RMA read request message have been received by the initiator network interface, the method 800 includes indicating a completion of the corresponding RMA read request message (stage 875). Upon determining that all data bytes of the data requested by the RMA read request identified by the command ID included in the received RMA read response have arrived at the initiator network interface 240, the RMA controllers 250 of FIG. 2 are configured to indicate a completion of the RMA read request message by modifying the corresponding entry of the command ID within the command table 265 of the initiator network interface 240. Meanwhile, the initiator host 205 connected to the initiator network interface 240 waits for the RMA controllers 250 to indicate a completion of the command before using the data from its physical memory 210.

However, if all bytes of the data requested by the corresponding RMA read request have not been received or a completion of the corresponding RMA read request message is indicated, the method 800 includes waiting to receive a message at the initiator network interface (stage 880). Upon determining that all bytes of the data requested by the corresponding RMA read request have not been received or a completion of the corresponding RMA read request message has been indicated, the RMA controllers 250 of FIG. 2 are configured to wait to receive a message at the initiator network interface 240.

Figure 9:
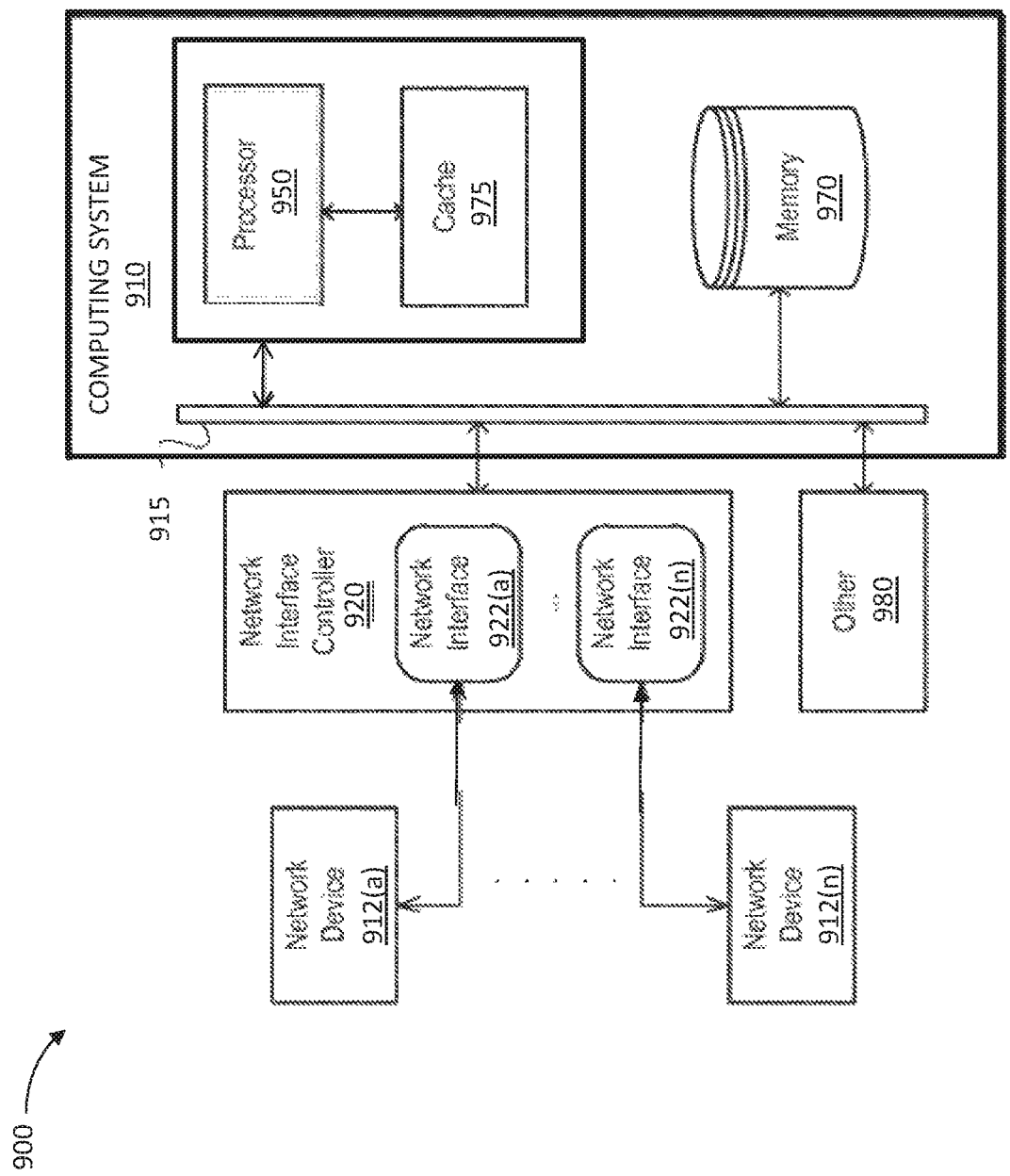
FIG. 9 is a diagram of a computing system suitable for use in the various implementations described.

FIG. 9 shows a block diagram of an example computing system 900. In some implementations, the computing system 900 may be utilized in implementing the hosts 205 shown in FIG. 2.

In broad overview, the computing system 910 includes at least one processor 950 for performing actions in accordance with instructions and one or more memory devices 970 or 975 for storing instructions and data. The illustrated example computing system 910 includes one or more processors 950 in communication, via a bus 915, with at least one network interface controller 920 with network interface ports 922(*a-n*) connecting to other computing devices 912(*a-n*), memory 970, and any other devices 980, e.g., an I/O interface. The network interface controller can be, for example, one of the network interfaces 240 shown in FIG. 2. Generally, a processor 950 will execute instructions received from memory. The processor 950 illustrated incorporates, or is directly connected to, cache memory 975.

In more detail, the processor 950 may be any logic circuitry that processes instructions, e.g., instructions fetched from the memory 970 or cache 975. In many embodiments, the processor 950 is a microprocessor unit or special purpose processor. The computing device 900 may be based on any processor, or set of processors, capable of operating as described herein. The processor 950 may be a single core or multi-core processor. The processor 950 may be multiple processors. In some implementations, the processor 950 can be configured to run multi-threaded operations. In some implementations, the processor 950 may host one or more VCIs, along with a hypervisor or container manager for managing the operation of the VCIs.

The memory 970 may be any device suitable for storing computer readable data. The memory 970 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and BluRay® discs). A computing system 900 may have any number of memory devices 970. In some implementations, the memory 970 supports virtualized or containerized memory accessible by VCI execution environments provided by the computing system 910.

The cache memory 975 is generally a form of computer memory placed in close proximity to the processor 950 for fast read times. In some implementations, the cache memory 975 is part of, or on the same chip as, the processor 950. In some implementations, there are multiple levels of cache 975, e.g., L2 and L3 cache layers.

The network interface controller 920 manages data exchanges via the network interfaces 922(*a-n*) (also referred to as network interface ports). The network interface controller 920 handles the physical and data link layers of the OSI model for network communication. The network interface ports 922(*a-n*) are connection points for physical network links. In some implementations, the network interface controller 920 supports wireless network connections and an interface port 922 is a wireless receiver/transmitter. Generally, a computing system 910 exchanges data with other computing devices 912(*a-n*) via physical or wireless links to the network interfaces 922(*a-n*). In some implementations, the network interface controller 920 implements a network protocol such as Ethernet or other network protocols.

The other network devices 912(*a-n*) are connected to the computing system 910 via respective network interface ports 922. The other network devices 912(*a-n*) may be peer computing devices, network devices, or any other computing device with network functionality. In such implementations, the interface controller 920 can serve as a top of rack (ToR) switch for the computing devices 912(*a-n*).

The other devices 980 may include an I/O interface, other external serial device ports, and any additional co-processors. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more VCIs that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method comprising:
   transmitting, by an initiator network interface, a Remote Memory Access (RMA) read request message, to a target network interface, in response to a request initiated by one of a plurality of host computers electrically connected to the initiator network interface, wherein:
   the target network interface can access one of a plurality of registered memory regions of each of a plurality of host computers electrically connected to the target network interface,
   each of the plurality of registered memory regions is within a physical memory of one of the plurality of host computers connected to the target network interface,
   each of the plurality of registered memory regions corresponds to a memory region allocated to one of a plurality of applications executing on a corresponding one of the host computers connected to the target network interface,
   each of a first plurality of region access keys stored on the initiator network interface corresponds to one of the plurality of registered memory regions, the RMA read request message includes a RMA operation, an identifier of one of the registered memory regions, an identifier of a memory location within the identified registered memory region and host memory access request information generated based on at least the region access key corresponding to the identified registered memory region,
   the region access key stored on the initiator network interface corresponding to the registered memory region identified in the RMA read request can be used by any of the plurality of host computers connected to the initiator network interface to request data from the registered memory region,
   the RMA read request message is configured to contain information to allow the target network interface to evaluate the authority of the source of the RMA read request message to access the identified registered memory region; and
   receiving, at the initiator network interface, in response to the transmitted RMA read request, at least one RMA response communication, transmitted by the target network interface, including data retrieved from the identified memory location within the identified registered memory region.

2. The method of claim 1, wherein each of the plurality of hosts connected to the initiator network interface is electrically connected to the initiator network interface by a serial computer expansion bus and each of the plurality of hosts connected to the target network interface is electrically connected to the target network interface by a serial computer expansion bus.

3. The method of claim 1, further comprising:
encrypting one or more portions of the RMA read request message using a cryptographic key formed using at least the host memory access request information; and
including a result of the encryption as authentication data in the RMA read request message.

4. The method of claim 3 further comprising:
determining, by the initiator network interface, whether any of the first plurality of region access keys stored on the initiator network interface corresponds to the identified registered memory region; and
in response to determining that none of the first plurality of region access keys stored on the initiator network interface correspond to the identified registered memory region, requesting, by the initiator network interface from the host computer that initiated the request, a corresponding region access key for the identified registered memory region.

5. The method of claim 1, wherein the received at least one RMA response communication includes a response data offset relative to the identified memory location within the identified registered memory region.

6. The method of claim 1, wherein the at least one RMA response communication includes one or more encrypted portions, the at least one RMA response communication includes authentication data and the method further comprises:
evaluating the one or more encrypted portions of the RMA response communication using a cryptographic key formed using at least the region key corresponding to the identified registered memory region and the response byte offset included in the RMA response communication;
comparing a result of the evaluation to the authentication data included in the RMA response communication;
in response to the comparison validating the authentication data, successfully decrypting the encrypted one or more portions of the RMA response communication; and
in response to the comparison not validating the authentication data, discarding the RMA response communication.

7. The method of claim 1, wherein the first plurality of registered memory region access keys stored on the initiator network interface correspond to a subset of the plurality of registered memory regions of the one or more hosts connected to the target network interface.

8. The method of claim 1, wherein:
the initiator network interface can access one of a plurality of registered memory regions of at least one of the plurality of host computers connected to the initiator network interface,
each of the plurality of registered memory regions is within a physical memory of one of the plurality of host computers electrically connected to the initiator network interface,
each of the plurality of registered memory regions is allocated to one of a plurality of applications executing on a corresponding one of the host computers,
a second plurality of registered memory region access keys are stored on the initiator network interface, and
each of the second plurality of registered memory region access keys corresponds to one of the plurality of registered memory regions of each of the plurality of host computers connected to the initiator network interface.

9. The method of claim 1, wherein information related to the transmitted RMA read request message is stored on the initiator network interface.

10. The method of claim 9, wherein in response to the transmitted RMA read request message timing out, the method further comprises:
modifying the information related to the transmitted RMA read request message stored on the initiator network interface.

11. The method of claim 9, wherein the transmitted RMA read request message is timed out after a pre-set amount of time elapses after the RMA read request is transmitted and before the initiator network receives a complete RMA response.

12. The method of claim 9 further comprising:
writing the retrieved data included in the received RMA response communication if the information related to the transmitted RMA read request message that is stored on the initiator network interface does not indicate that the transmitted RMA read request message has timed out.

13. A system comprising:
an initiator network interface comprising:
one or more processors configured to:
transmit, by the initiator network interface, a Remote Memory Access (RMA) read request message, to a target network interface, in response to a request initiated by one of a plurality of host computers electrically connected to the initiator network interface, wherein:
the target network interface can access one of a plurality of registered memory regions of each of a plurality of host computers electrically connected to the target network interface,
each of the plurality of registered memory regions is within a physical memory of one of the plurality of host computers connected to the target network interface,
each of the plurality of registered memory regions corresponds to a memory region allocated to one of a plurality of applications executing on a corresponding one of the host computers connected to the target network interface, wherein no more than one registered memory region is associated with any application executing on any host computer connected to the target network interface,
each of a first plurality of region access keys stored on the initiator network interface corresponds to one of the plurality of registered memory regions,
the RMA read request message includes a RMA operation, an identifier of one a the registered memory regions, an identifier of a memory location within the identified registered memory region and host memory access request information generated based on at least the region access key corresponding to the identified registered memory region,
the RMA read request message is configured to contain information to allow the target network interface to evaluate the authority of the source of the RMA read request message to access the identified registered memory region,
the region access key stored on the initiator network interface corresponding to the registered memory region identified in the RMA read request can be used by any of the plurality of host computers connected to the initiator network interface to request data from the registered memory region; and receive, at the initiator network interface, in response to the transmitted RMA read request, at least one RMA response communication, transmitted by the target network interface, including data retrieved from the identified memory location within the identified registered memory region.

14. The system of claim 13, wherein each of the plurality of hosts connected to the initiator network interface is electrically connected to the initiator network interface by a serial computer expansion bus and each of the plurality of hosts connected to the target network interface is electrically connected to the target network interface by a serial computer expansion bus.

15. The system of claim 13, wherein the one or more processors are further configured to:
encrypt one or more portions of the RMA read request message using a cryptographic key formed using at least the host memory access request information; and
include a result of the encryption as authentication data in the RMA read request message.

16. The system of claim 15, wherein the one or more processors are further configured to:
determine whether any of the first plurality of region access keys stored on the initiator network interface corresponds to the identified registered memory region; and in response to determining that none of the first plurality of region access keys stored on the initiator network interface correspond to the identified registered memory region, requesting, from the host computer that initiated the request, a corresponding region access key for the identified registered memory region.

17. The system of claim 13, wherein the received at least one RMA response communication includes a response data offset relative to the identified memory location within the identified registered memory region.

18. The system of claim 13, wherein the at least one RMA response communication includes one or more encrypted portions, the at least one RMA response communication includes authentication data and the one or more processors are further configured to:
evaluate the one or more encrypted portions of the RMA response communication using a cryptographic key formed using at least the region key corresponding to the identified registered memory region and the response byte offset included in the RMA response communication;
compare a result of the evaluation to the authentication data included in the RMA response communication;
in response to the comparison validating the authentication data, successfully decrypt the encrypted one or more portions of the RMA response communication; and
in response to the comparison not validating the authentication data, discard the RMA response communication.

19. The system of claim 13, wherein the first plurality of registered memory region access keys stored on the initiator network interface correspond to a subset of the plurality of registered memory regions of the one or more hosts connected to the target network interface.

20. The system of claim 13, wherein:
the initiator network interface can access one of a plurality of registered memory regions of each of the plurality of host computers connected to the initiator network interface,
each of the plurality of registered memory regions is within a physical memory of one of the plurality of host computers electrically connected to the initiator network interface,
each of the plurality of registered memory regions is allocated to one of a plurality of applications executing on a corresponding one of the host computers,
a second plurality of registered memory region access keys are stored on the initiator network interface, and
each of the second plurality of registered memory region access keys correspond to one of the plurality of registered memory regions of at least one of the plurality of host computers connected to the initiator network interface.

21. The system of claim 13, wherein information related to the transmitted RMA read request message is stored on the initiator network interface.

22. The system of claim 21, wherein in response to the transmitted RMA read request message timing out, the one or more processors are further configured to:
modify the information related to the transmitted RMA read request message stored on the initiator network interface.

23. The system of claim 21, wherein the transmitted RMA read request message is timed out if a pre-set amount of time elapses after the RMA read request is transmitted and before the initiator network receives a complete RMA response.

24. The system of claim 21, wherein the one or more processors are further configured to:
write the retrieved data included in the received RMA response communication if the information related to the transmitted RMA read request message that is stored on the initiator network interface does not indicate that the transmitted RMA read request message has timed out.

25. A non-transitory computer-readable medium storing instructions that, when executed by one or more processors, cause the one or more processors to:
transmit, by an initiator network interface, a Remote Memory Access (RMA) read request message, to a target network interface, in response to a request initiated by one of a plurality of host computers electrically connected to the initiator network interface, wherein:
the target network interface can access one of a plurality of registered memory regions of each of a plurality of host computers electrically connected to the target network interface,
each of the plurality of registered memory regions is within a physical memory of one of the plurality of host computers connected to the target network interface,
each of the plurality of registered memory regions corresponds to a memory region allocated to one of a plurality of applications executing on a corresponding one of the host computers connected to the target network interface, wherein no more than one registered memory region is associated with any application executing on any host computer connected to the target network interface,
each of a first plurality of region access keys stored on the initiator network interface corresponds to one of the plurality of registered memory regions, the RMA read request message includes a RMA operation, an identifier of one a the registered memory regions, an identifier of a memory location within the identified registered memory region and host memory access request information generated based on at least the region access key corresponding to the identified registered memory region, the RMA read request message is configured to contain information to allow the target network interface to evaluate the authority of the source of the RMA read request message to access the identified registered memory region, the region access key stored on the initiator network interface corresponding to the registered memory region identified in the RMA read request can be used by any of the plurality of host computers connected to the initiator network interface to request data from the registered memory region; and receive, at the initiator network interface, in response to the transmitted RMA read request, at least one RMA response communication, transmitted by the target network interface, including data retrieved from the identified memory location within the identified registered memory region.

26. The non-transitory computer-readable medium of claim 25, wherein each of the plurality of hosts connected to the initiator network interface is electrically connected to the initiator network interface by a serial computer expansion bus and each of the plurality of hosts connected to the target network interface is electrically connected to the target network interface by a serial computer expansion bus.

27. The non-transitory computer-readable medium of claim 25, where the one or more processors are further configured to:
encrypt one or more portions of the RMA read request message using a cryptographic key formed using at least the host memory access request information; and
include a result of the encryption as authentication data in the RMA read request message.

28. The non-transitory computer-readable medium of claim 27, wherein the one or more processors are further configured to: determine whether any of the first plurality of region access keys stored on the initiator network interface corresponds to the identified registered memory region; and in response to determining that none of the first plurality of region access keys stored on the initiator network interface correspond to the identified registered memory region, requesting, from the host computer that initiated the request, a corresponding region access key for the identified registered memory region.

29. The non-transitory computer-readable medium of claim 27, wherein the at least one RMA response communication includes one or more encrypted portions, the at least one RMA response communication includes authentication data and the one or more processors are further configured to:
evaluate the one or more encrypted portions of the RMA response communication using a cryptographic key formed using at least the region key corresponding to the identified registered memory region and the response byte offset included in the RMA response communication;
compare a result of the evaluation to the authentication data included in the RMA response communication;
in response to the comparison validating the authentication data, successfully decrypt the encrypted one or more portions of the RMA response communication; and
in response to the comparison not validating the authentication data, discard the RMA response communication.

30. The non-transitory computer-readable medium of claim 25, wherein the received at least one RMA response communication includes a response data offset relative to the identified memory location within the identified registered memory region.

31. The non-transitory computer-readable medium of claim 25, wherein the first plurality of registered memory region access keys stored on the initiator network interface correspond to a subset of the plurality of registered memory regions of the one or more hosts connected to the target network interface.

32. The non-transitory computer-readable medium of claim 25, wherein:
the initiator network interface can access one of a plurality of registered memory regions of each of the plurality of host computers connected to the initiator network interface,
each of the plurality of registered memory regions is within a physical memory of one of the plurality of host computers electrically connected to the initiator network interface,
each of the plurality of registered memory regions is allocated to one of a plurality of applications executing on a corresponding one of the host computers,
a second plurality of registered memory region access keys are stored on the initiator network interface, and
each of the second plurality of registered memory region access keys correspond to one of the plurality of registered memory regions of at least one of the plurality of host computers connected to the initiator network interface.

33. The non-transitory computer-readable medium of claim 25, wherein information related to the transmitted RMA read request message is stored on the initiator network interface.

34. The non-transitory computer-readable medium of claim 33, wherein the instructions cause the one or more processors to:
in response to the transmitted RMA read request message timing out, modify the information related to the transmitted RMA read request message stored on the initiator network interface.

35. The non-transitory computer-readable medium of claim 33, wherein the transmitted RMA read request message is timed out if a pre-set amount of time elapses after the RMA read request is transmitted and before the initiator network receives a complete RMA response.

* * * * *